(12) United States Patent
Wiwe et al.

(10) Patent No.: US 7,328,593 B2
(45) Date of Patent: Feb. 12, 2008

(54) REFRIGERANT VALVE ARRANGEMENT

(75) Inventors: Joergen Seindal Wiwe, Solbjerg (DK); Kenneth Michelsen, Aarhus (DK); Lars Denning, Odder (DK)

(73) Assignee: Danfoss A/S, Nordborg (DK)

( * ) Notice: Subject to any disclaimer, the term of this patent is extended or adjusted under 35 U.S.C. 154(b) by 143 days.

(21) Appl. No.: 11/009,430

(22) Filed: Dec. 10, 2004

(65) Prior Publication Data

US 2005/0155376 A1 Jul. 21, 2005

(30) Foreign Application Priority Data

Dec. 10, 2003 (DE) .............................. 103 58 085

(51) Int. Cl.
*F25B 41/06* (2006.01)
*E03B 1/00* (2006.01)

(52) U.S. Cl. ........................................ 62/527; 137/613

(58) Field of Classification Search .................. 62/222, 62/524, 525, 526, 527; 137/614.2, 614.21, 137/377, 613; 251/84, 86

See application file for complete search history.

(56) References Cited

U.S. PATENT DOCUMENTS

| | | | | |
|---|---|---|---|---|
| 1,657,173 A | | 1/1928 | Morrison | |
| 3,796,368 A | * | 3/1974 | Katchka | .................... 236/80 R |
| 4,147,179 A | * | 4/1979 | Miura | .................... 137/599.09 |
| 4,275,764 A | * | 6/1981 | Baret | .................... 137/614.19 |
| 4,550,896 A | | 11/1985 | Hansen, III | .................... 251/84 |
| 4,736,766 A | | 4/1988 | Bathrick et al. | ............. 137/315 |
| 4,776,365 A | | 10/1988 | Bathrick et al. | ......... 137/329.5 |
| 5,139,225 A | * | 8/1992 | Olson et al. | ................ 251/61.2 |
| 5,638,862 A | * | 6/1997 | Miller | ......................... 137/557 |
| 5,664,759 A | * | 9/1997 | Evans et al. | ................ 251/63.5 |
| 5,685,164 A | | 11/1997 | Gardner | ........................ 62/217 |
| 5,727,605 A | * | 3/1998 | Ballu | ........................... 141/20 |
| 5,863,023 A | * | 1/1999 | Evans et al. | ................ 251/63.5 |
| 6,035,609 A | * | 3/2000 | Evans et al. | ................... 53/432 |
| 6,186,177 B1 | * | 2/2001 | Maher | ......................... 137/884 |
| 6,227,223 B1 | * | 5/2001 | Crochet et al. | ........... 137/15.16 |
| 6,349,744 B1 | * | 2/2002 | Grosshart | .................... 137/884 |
| 6,732,996 B1 | * | 5/2004 | Kremer | ........................ 251/14 |

FOREIGN PATENT DOCUMENTS

| | | |
|---|---|---|
| CH | 202038 | 7/1939 |
| DE | 4341579 | 8/1994 |
| DE | 195 14 978 A1 | 10/1996 |
| EP | 0 682 217 A2 | 5/1995 |
| GB | 1 546 994 | 6/1979 |
| GB | 2 344 873 A | 12/1998 |
| JP | 4-258595 | 9/1992 |
| WO | WO 84/04373 | 11/1984 |

* cited by examiner

*Primary Examiner*—Mohammad M. Ali
(74) *Attorney, Agent, or Firm*—McCormick, Paulding & Huber LLP

(57) ABSTRACT

A refrigerant valve arrangement is described, having a housing which has a first functional space, in which there is arranged at least one functional element, which co-operates with a first annular contact surface formed in an internal boundary wall. It is desirable to be able to match a refrigerant valve arrangement to different functions with little outlay. For that purpose there is provided, arranged on that side of the boundary wall which is located opposite the first functional space, a second functional space, in which a second functional element can be positioned and which has a second annular contact surface, a channel which passes through the boundary wall opening out in both contact surfaces.

18 Claims, 2 Drawing Sheets

REFRIGERANT VALVE ARRANGEMENT

CROSS-REFERENCE TO RELATED APPLICATIONS

This application is entitled to the benefit of and incorporates by reference essential subject matter disclosed in German Patent Application No. 103 58 085.9 filed on Dec. 10, 2003.

FIELD OF THE INVENTION

The invention relates to a refrigerant valve arrangement having a housing which has a first functional space, in which there is arranged at least one functional element, which co-operates with a first annular contact surface formed in an internal boundary wall.

BACKGROUND OF THE INVENTION

A valve arrangement of such a kind, which is also provided for refrigerant, is known from U.S. Pat. No. 4,550,896. The housing is, in that case, so arranged that various functional elements can be inserted. The functional elements can be, for example, valve elements which co-operate with a valve seat formed on the contact surface. They can consist of a strainer which is in contact with the contact surface or they can consist of a non-return valve.

SUMMARY OF THE INVENTION

The invention is based on the problem of matching a refrigerant valve arrangement to different functions with little outlay.

The problem is solved in the case of a refrigerant valve arrangement of a kind mentioned at the beginning by arranging on that side of the boundary wall which is located opposite the first functional space a second functional space, in which a second functional element can be positioned and which has a second annular contact surface, a channel which passes through the boundary wall opening out in both contact surfaces.

This arrangement makes it possible, by relatively simple means, for more than one functional element at the same time to be accommodated in the housing. The two functional elements are simply arranged on sides of the internal boundary wall which are located opposite one another. This is possible without any problems because appropriate contact surfaces are provided on both sides of the internal boundary wall. Communication between the first functional space and the second functional space is provided by the channel which passes through the internal boundary wall.

Preferably, the second functional space is, on that side which is located opposite the boundary wall, bounded by a bottom external wall, which on its bottom external surface has a flat mounting surface. When here and hereinbelow terms such as "bottom" and "top" are used they do not fix the arrangement of the housing in space. Rather, the terms are used for easier differentiation of individual elements. As a result of the fact that the bottom external surface has a flat mounting surface it is made possible, by simple means, for further functional elements to be mounted there and fixed in place, or for corresponding drilled holes to be provided which serve for receiving functional elements. In many cases it will be advantageous at first to leave the bottom external wall intact, that is to say closed, and then, depending on the desired functional element to be fitted, to make a corresponding access hole and also, where appropriate, corresponding fixing holes. One and the same model of housing can then be used for different valve arrangements.

Preferably, at least two pairs, each formed by a first and a second functional space, are arranged next to one another in the housing, a first functional space of a pair being in communication with a second functional space of a neighbouring pair. In that case it is also possible to use more than two functional elements, which in many cases is advantageous. Refrigerant systems hitherto have generally had one housing per function. Each of those housings then has to be individually mounted in a refrigeration line. Even though in some cases two or more functions can be combined in one sub-assembly, this is currently accomplished by joining individual housings together. The fact that it is now possible to accommodate the several functions in a single housing facilitates mounting. Because there is no requirement for the same functional element always to be mounted in a functional space, the valve arrangement is very flexible when the housing is used. The individual functional spaces are serially connected so that refrigerant can flow through them one after the other.

In this arrangement it is preferred that of four functional spaces of two neighbouring pairs, at least three functional spaces are provided with a functional element. It is, accordingly, not necessary for all the functional spaces to be equipped with a functional element. However, it is advantageous if more than half of the functional spaces are provided with functional elements.

It is also advantageous when all the functional spaces are serially arranged. This results in the same refrigerant flow through all the functional spaces and, as a result, through all the functional elements arranged in the functional spaces.

Preferably, at least one first functional space is, by means of an extension, extended to an effective length which corresponds to the effective length of the second functional space. The extension can be formed, for example, by a cylindrical member, optionally having fastening flanges at its axial ends. The extension provides the possibility of using the same valve types or functional parts both in the first and also in the second functional spaces.

Preferably, the housing has a top external wall which, on its underside, has projections at bolt fixing positions. By virtue of the bolt fixing positions there is obtained, by simple means, sufficient material to be able to fasten a bolt with adequate reliability at a later time. Otherwise, however, only relatively little material is required to surround the individual functional spaces. Accordingly, the housing does not have to be in the form of a block which requires a great deal of material, but rather the individual formations actually important for the function of the valve arrangement in practice can be provided. The projections can be used but do not have to be used. If a bolt is required for fastening a functional element, a thread is cut in corresponding manner in the top external wall, which thread can then be continued in the projection on the underside. As a result, a thread of sufficient length is available. If fastening of such a kind is not required, the housing is left without a corresponding thread.

Preferably, the top external wall is, at the outlets from the first functional spaces, provided with an annular bead in each case. A fastening surface can then be produced on the annular bead without having to machine the entire outside of the external wall.

Preferably, the second contact surface has a ring-like projection, which surrounds the channel. This also facilitates manufacture. When the second contact surface is, for example, to take the form of a valve seat, it is simpler to machine the ring-like projection than the entire side of the boundary wall which bounds the second functional space.

Preferably, the housing has an inlet, which is in communication with a functional space, and an outlet, which is in communication with a functional space, a shut-off valve being arranged in each of those two functional spaces. The function of those shut-off valves is to isolate the complete valve arrangement from the rest of the refrigerant line system when this is necessary for maintenance reasons or for replacing or cleaning individual functional elements. When, for example, a filter is to be cleaned, it is sufficient for the two shut-off valves to be closed. In that case, no refrigerant can flow through the housing. The housing can then be opened at individual locations, for example in order to remove the filter.

It is also preferred for at least two different functional elements from a group comprising a non-return valve, a shut-off valve, a throttle valve, an injection valve and a filter element to be arranged in the functional spaces.

BRIEF DESCRIPTION OF THE DRAWINGS

The invention is described hereinbelow with reference to a preferred exemplary embodiment in conjunction with the drawings, wherein.

DETAILED DESCRIPTION OF THE PREFERRED EMBODIMENTS

Figure 1:
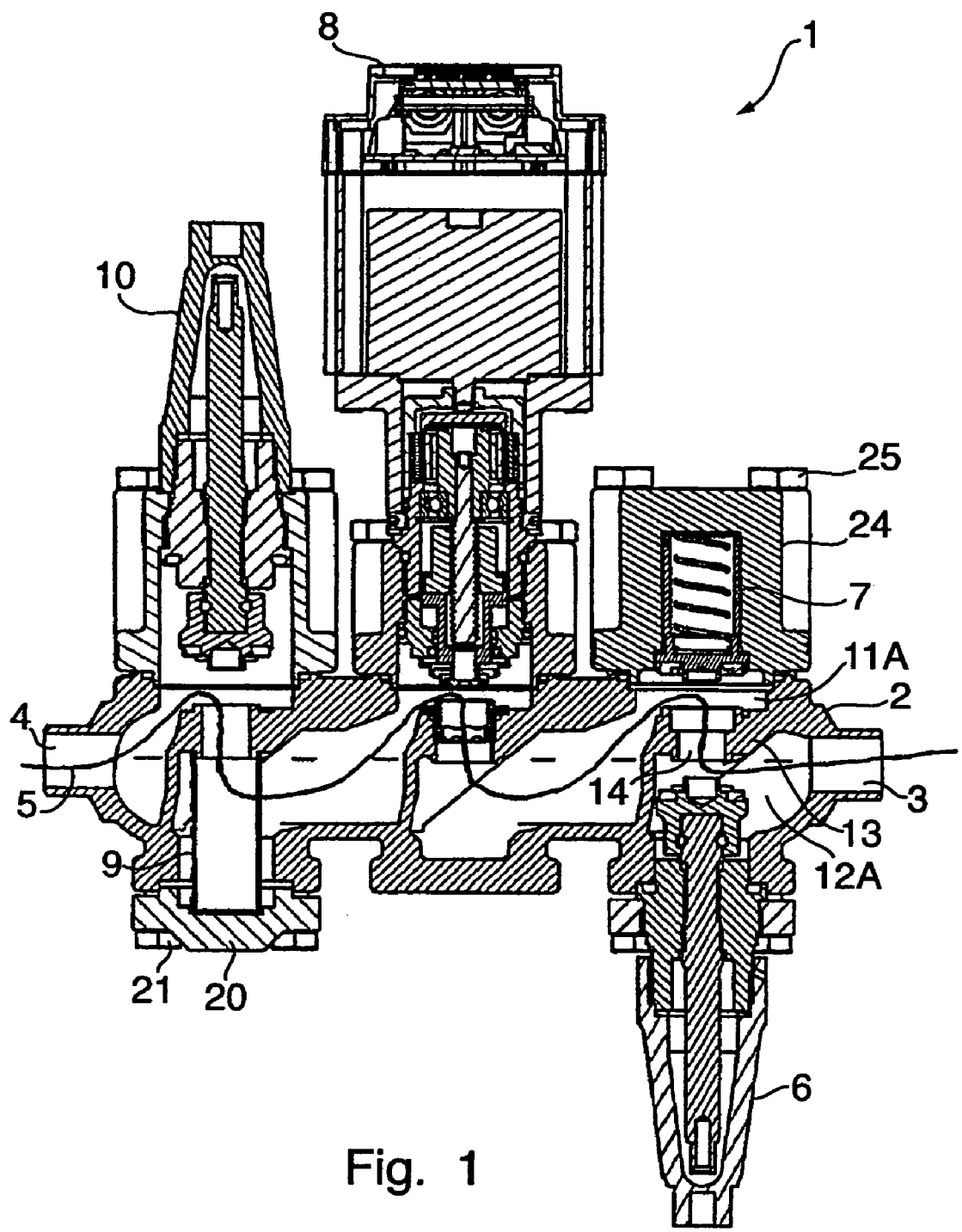
FIG. 1 is a diagrammatic longitudinal section, a refrigerant valve arrangement.

A refrigerant valve arrangement 1 has a housing 2 having an inlet 4 and an outlet 3. Provided between the inlet 4 and the outlet 3 is a flow path 5 (shown by an unbroken line) for refrigerant. For controlling the flow of the refrigerant through the valve arrangement 1 there are provided various functional elements, all of which are inserted in the housing 2.

Firstly, the refrigerant is controlled by a shut-off valve 10, which closes off the flow path 5 at the inlet 4. Following on therefrom in the flow path 5 is a filter 9. From the filter 9, the flow path 5 proceeds to a throttle valve 8. The throttle valve 8 performs the actual control of the refrigerating system. From the throttle valve 8, the flow path proceeds through a free space in the housing to a non-return valve 7 and from there to a second shut-off valve 10, which is arranged at the outlet 3 from the housing 2. By means of the two shut-off valves 6, 10, the valve arrangement 1 can be completely isolated from the refrigerant line system (not shown), for example so that the filter 9 can be cleaned, the throttle valve 8 adjusted or the non-return valve 7 replaced.

Figure 2:
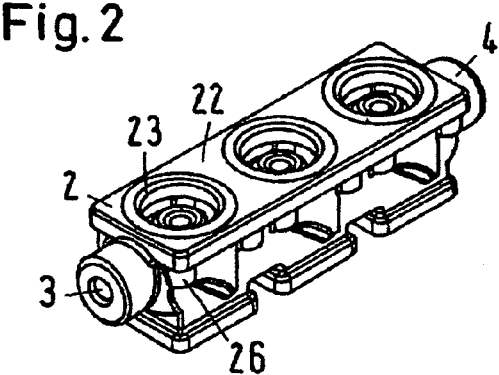
FIG. 2 is a perspective view of a longitudinally cut-away housing of the refrigerant valve arrangement.
Figure 3:
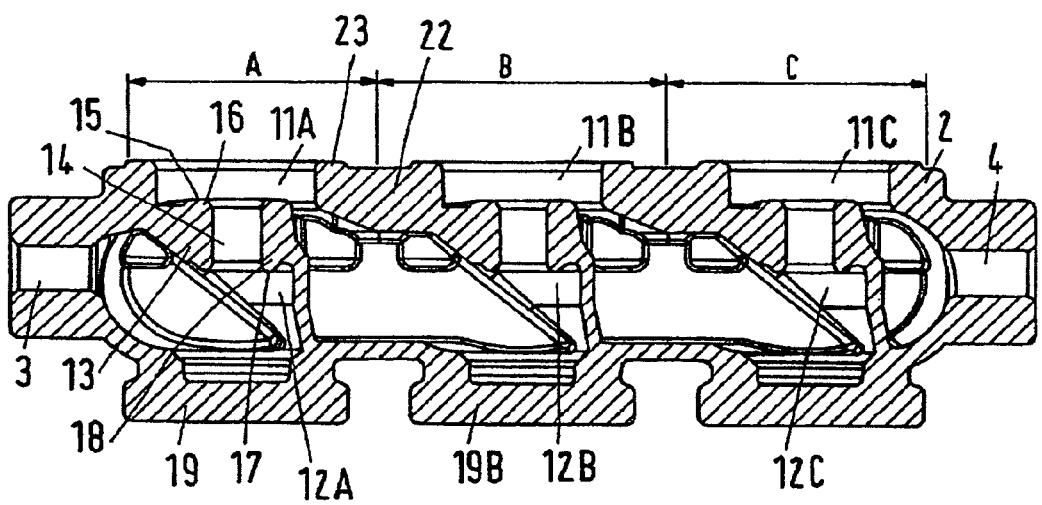
FIG. 3 is a longitudinal section through a basic form of the housing.
Figure 4:
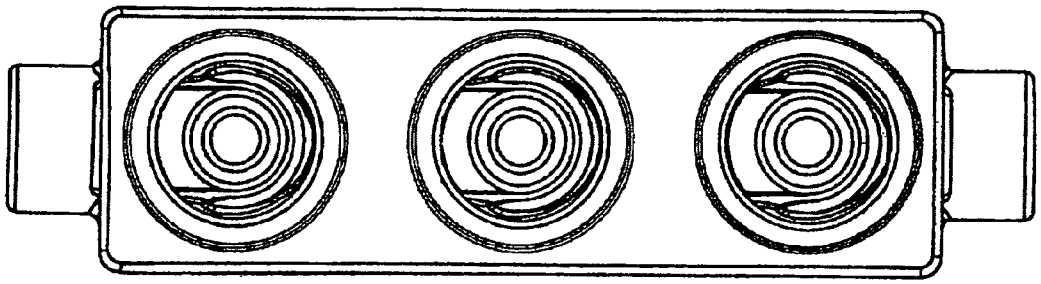
FIG. 4 is a plan view of the housing.

FIGS. 2 to 4 show the housing 2 without the individual functional elements 6-10. The housing 2 has three substantially identical portions A, B, C, which are arranged next to one another. Each portion A, B, C has a first functional space 11A, 11B, 11C and a second functional space 12A, 12B, 12C. For reasons of illustration, the first functional spaces 11 are also referred to as the "upper functional space" and the second functional spaces 12 as the "lower functional space". It is also possible for more than the three shown portions A, B, C to be provided. At least two such portions A, B, C should be provided.

The following explanation is made with reference to portion A. It will be clear that the equivalent applies to the other portions B, C.

The first functional space 11A and the second functional space 12A are separated from one another by an internal boundary wall 13, through which a channel 14 passes. At the upper end of the channel 14 there is formed a first contact surface 15 on an annular bead 16, which surrounds the opening of the channel 14. In the embodiment according to FIG. 1, the valve element of the non-return valve 7 is in contact with that contact surface 15.

In similar manner, in the second functional space 12A, a second contact surface 17 is provided on a ring-like projection 18, which surrounds the opening of the channel 14 in the second functional space 12A. The valve element of the shut-off valve 6 comes into contact with the second contact surface 17 when the shut-off valve 6 is closed.

The housing 2, the basic form of which is shown in FIG. 3, is still completely closed on its underside, that is to say it has a bottom external wall 19, in which a drilled hole must be provided in order to be able to mount the shut-off valve 6. The corresponding bottom external wall 19B in portion B can, in contrast, remain closed because only the throttle valve 8 is arranged in portion B; the second functional space 12B is, in contrast, not provided with a functional element. The bottom external wall 19 forms, on its bottom external surface, a flat mounting surface, against which the shut-off valve 6 or a cover 20 for holding the filter can be placed and connected by screws 21.

Associated with the top external wall 22 are annular beads 23, which each surround a respective opening of the first functional spaces 11A, 11B, 11C. Those annular beads 23 can be machined as contact surfaces.

Associated with the upper or first functional spaces 11A, 11B, 11C are cylindrical prolongations 24 (FIG. 1), which extend the first functional space 11 to an effective length which corresponds to the effective length of the second functional space 12. By that means, it is possible for the same types of functional elements 6-10 to be used both in the first functional spaces 11 and in the second functional spaces 12. The corresponding functional elements can then be fixed to the housing 2 using threaded bolts 25.

As can be seen from FIG. 2, the housing 2 in its basic form or basic state does not yet have any fixing arrangements. If it is desired to fix functional elements 6-10 in place using threaded bolts 25, threaded holes (not shown) have to be cut in the top external wall. Those threaded holes can then pass through the top external wall 22 and continue in projections 26, which are in each case provided where bolts are possibly to be positioned, that is to say at bolt fixing positions. As a result of those projections 26, sufficient "meat" is available so that a bolt having a thread of the requisite length can be held in the housing 2.

The housing 2 can be matched to different valve configurations by relatively simple means. When they co-operate with valves 6, 7, 8, 10, the first contact surfaces 15 must be machined. The same applies to the second contact surfaces 17. As can be seen from FIG. 1, machining of the second contact surface in portion B is not necessary. In portion C, where the filter 9 is used as a functional element, corresponding machining is advisable.

The bottom external wall 19 is drilled through only in the case of those second functional spaces 12 into which a functional element is to be inserted. When a hole is drilled, a thread can optionally be cut, as necessary. A thread can also be cut into the upper functional spaces 11, if necessary. Otherwise, it is necessary to provide threaded holes only where functional elements have to be fixed in place.

In addition to the functional elements shown in FIG. 1, injection valves can also be used, it being possible to use both manual-type and mechanical-type injection valves.

When the shut-off valves 6, 10 have been closed, maintenance can be carried out on the valves located therebetween or the latter can be replaced.

The flow path 5 proceeds from the inlet 4 to the first functional space 11C of portion C and, from there, through the channel 14 to the second functional space 12C. From the second functional space 12C of portion C, the flow path 5 proceeds to the first functional space 11B of the second portion B, and from there to the second functional space 12B etc. Refrigerant accordingly passes through the functional spaces 11, 12 serially.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A refrigerant valve arrangement comprising:
an integral housing which has a first functional space, in which there is arranged at least one functional element, which co-operates with a first annular contact surface formed in an internal boundary wall, wherein arranged on that side of the boundary wall which is located opposite the first functional space is a second functional space, in which a second functional element can be positioned and which has a second annular contact surface, a channel which passes through the boundary wall opening out in both contact surfaces.

2. The valve arrangement according to claim 1, wherein the second functional space is, on that side which is located opposite the boundary wall, bounded by a bottom external wall, which on its bottom external surface has a flat mounting surface.

3. The valve arrangement according to claim 1, wherein at least two pairs, each formed by a first and a second functional space, are arranged next to one another in the housing, a first functional space of a pair being in communication with a second functional space of a neighbouring pair.

4. The valve arrangement according to claim 3, wherein of four functional spaces of two neighbouring pairs, at least three functional spaces are provided with a functional element.

5. The valve arrangement according to claim 1, wherein all the functional spaces are serially arranged.

6. The valve arrangement according to claim 1, wherein at least one first functional space is, by means of an extension, extended to an effective length which corresponds to the effective length of the second functional space.

7. The valve arrangement according to claim 1, wherein the housing has a top external wall which, on its underside, has projections at bolt fixing positions.

8. The valve arrangement according to claim 7, wherein at the outlets from the first functional spaces, the top external wall is provided with an annular bead in each case.

9. The valve arrangement according to claim 1, wherein the second contact surface has a ring-like projection, which surrounds the channel.

10. The valve arrangement according to claim 1, wherein the housing has an inlet, which is in communication with a functional space, and an outlet, which is in communication with a functional space, a shut-off valve being arranged in each of those two functional spaces.

11. The valve arrangement according to claim 1, wherein there are arranged in the functional spaces at least two different functional elements from a group comprising a non-return valve, a shut-off valve, a throttle valve, an injection valve and a filter element.

12. A refrigerant valve manifold comprising: a housing defining an interior volume, the housing having an inlet and outlet formed therein, the inlet and the outlet being in communication with the interior volume;
a plurality of mounting surfaces arranged on the housing, the mounting surfaces adapted for mounting refrigerant system components, at least a first and a second of the plurality of mounting surfaces being substantially opposed,
at least one boundary wall arranged in the housing interior such that the housing interior is divided into a plurality of spaces; a portion of the boundary wall being disposed between the first and second mounting surfaces, the portion of the boundary wall disposed between the first and second mounting surfaces having a channel extending therethrough; and
opposed first and second contact surfaces formed around opposite ends of the channel, the first and second contact surfaces facing towards the first and second mounting surfaces, respectively;
wherein a first distance between the first contact surface and the first mounting surface is substantially less than a second distance between the second contact surface and the second mounting surface.

13. The refrigerant valve manifold of claim 12, further comprising an extension arranged on the first mounting surface such that an extended distance between a distal end of the extension and the first contact surface is approximately equal to the second distance.

14. The refrigerant valve manifold of claim 12, wherein each contact surface includes an annular projection extending towards the respective mounting surface.

15. The refrigerant valve manifold of claim 12, wherein the inlet and the outlet are formed on opposite ends of the housing, such that the inlet and the outlet are substantially concentric with a common axis.

16. The refrigerant valve manifold of claim 12, wherein at least the first mounting surface and a third mounting surface are formed on a common external wall of the housing.

17. The refrigerant valve manifold of claim 16, wherein at least two edges of the common external wall overhang adjacent external surfaces of the housing, and a plurality of projections extend from undersides of the two overhanging edges, the projections being located under bolt fixing positions of the first and third mounting surfaces.

18. A refrigerant valve arrangement comprising:
an integral housing;
an internal boundary wall dividing the housing into a first functional space and a second functional space, the first and second functional spaces each being adapted to accommodate a functional element, the internal boundary wall having a channel defined therein, the channel extending between the first and second functional spaces;
first and second annular contact surfaces on the internal boundary wall, the first and second annular contact surfaces surrounding opposite ends of the channel; and
a functional element arranged in the first functional space, the functional element cooperating with the first annular contact surface.

* * * * *

(12) INTER PARTES REEXAMINATION CERTIFICATE (802nd)
United States Patent
Wiwe et al.

(10) Number: US 7,328,593 C1
(45) Certificate Issued: Jan. 16, 2014

(54) REFRIGERANT VALVE ARRANGEMENT

(75) Inventors: Joergen Seindal Wiwe, Solbjerg (DK); Kenneth Michelsen, Aarhus (DK); Lars Denning, Odder (DK)

(73) Assignee: Danfoss A/S, Nordborg (DK)

Reexamination Request:
No. 95/001,598, Apr. 8, 2011

Reexamination Certificate for:
Patent No.: 7,328,593
Issued: Feb. 12, 2008
Appl. No.: 11/009,430
Filed: Dec. 10, 2004

(30) Foreign Application Priority Data

Dec. 10, 2003 (DE) .................................. 103 58 085

(51) Int. Cl.
*F25B 41/06* (2006.01)
*E03B 1/00* (2006.01)

(52) U.S. Cl.
USPC ............................................ 62/527; 137/613

(58) Field of Classification Search
None
See application file for complete search history.

(56) References Cited

To view the complete listing of prior art documents cited during the proceeding for Reexamination Control Number 95/001,598, please refer to the USPTO's public Patent Application Information Retrieval (PAIR) system under the Display References tab.

*Primary Examiner* — William Doerrler

(57) ABSTRACT

A refrigerant valve arrangement is described, having a housing which has a first functional space, in which there is arranged at least one functional element, which co-operates with a first annular contact surface formed in an internal boundary wall. It is desirable to be able to match a refrigerant valve arrangement to different functions with little outlay. For that purpose there is provided, arranged on that side of the boundary wall which is located opposite the first functional space, a second functional space, in which a second functional element can be positioned and which has a second annular contact surface, a channel which passes through the boundary wall opening out in both contact surfaces.

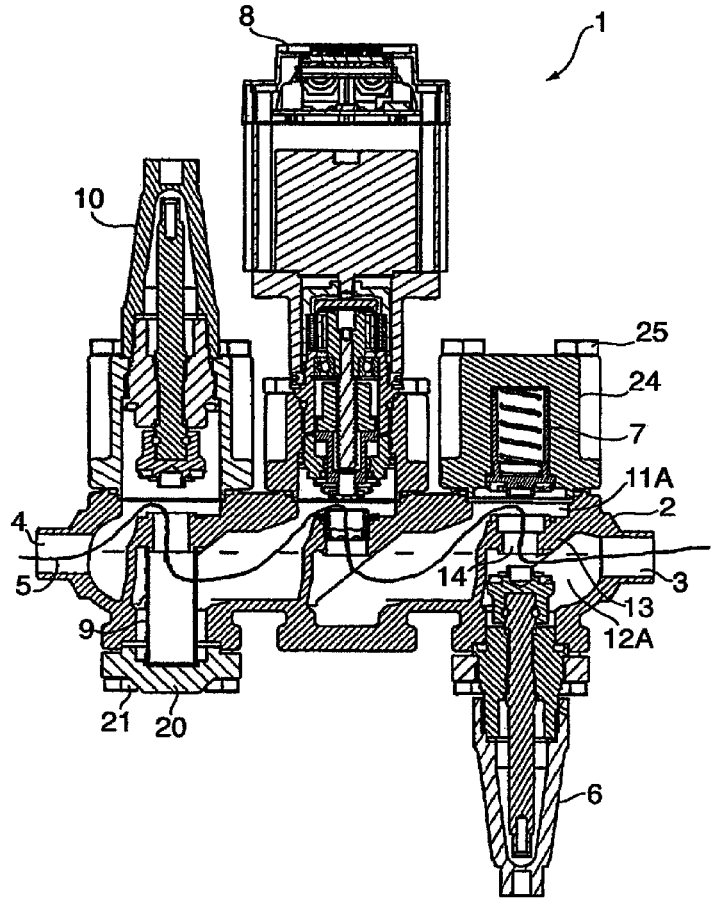

US 7,328,593 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5, 9-12, 14-16 and 18 are cancelled.

Claims 6, 7, 13 and 17 are determined to be patentable as amended.

Claim 8, dependent on an amended claim, is determined to be patentable.

New claims 19-24 are added and determined to be patentable.

6. [The valve arrangement according to claim 1] *A refrigerant valve arrangement comprising:*
   *an integral housing* having at least two pairs of functional spaces, each pair of functional spaces formed by a first functional space and a second functional space, the first pair of functional spaces having a first functional space, in which there is arranged at least one functional element, which co-operates with a first annular contact surface formed in an internal boundary wall, wherein arranged on that side of the boundary wall which is located opposite the first functional space is a second functional space, in which a second functional element can be positioned and which has a second annular contact surface on the internal boundary wall, a channel which passes through the boundary wall opening out in both contact surfaces;
   *wherein the at least two pairs of functional spaces are arranged within the integral housing, a first functional space of the second pair of functional spaces being in communication with the second functional space of the first pair of functional spaces; and*
   *wherein a flow path extends within the integral housing between a housing inlet and a housing outlet, the flow path passing serially through all of the functional spaces between the housing inlet and the housing outlet, wherein at least one first functional space is, by means of an extension, extended to an effective length which corresponds to the effective length of the second functional space.*

7. [The valve arrangement according to claim 1] *A refrigerant valve arrangement comprising:*
   *an integral housing which has a first functional space, in which there is arranged at least one functional element, which co-operates with a first annular contact surface formed in an internal boundary wall, wherein arranged on that side of the boundary wall which is located opposite the first functional space is a second functional space, in which a second functional element can be positioned and which has a second annular contact surface, a channel which passes through the boundary wall opening out in both contact surfaces,* wherein the housing has a top external wall which, on its underside, has projections at bolt fixing positions.

13. [The refrigerant valve manifold of claim 12] *A refrigerant valve manifold comprising:*
    *an integral housing defining an interior volume divided into at least two pairs of functional spaces, each pair of functional spaces including a first functional space and a second functional space, the integral housing having an inlet and outlet formed therein, the inlet and the outlet being in communication with the interior volume;*
    *a plurality of mounting surfaces arranged on the integral housing, each mounting surface of the plurality of mounting surfaces being associated with a functional space of the at least two pairs of functional spaces, the mounting surfaces adapted for mounting refrigerant system components in the functional spaces, at least a first and a second of the plurality of mounting surfaces being substantially opposed, and at least a third of the plurality of mounting surfaces being substantially adjacent to one of the first or second mounting surfaces;*
    *at least one boundary wall arranged in the housing interior, a portion of the boundary wall being disposed between the first and second mounting surfaces, the portion of the boundary wall disposed between the first and second mounting surfaces having a channel extending therethrough;*
    *a flow path extending through the interior volume within the integral housing between the inlet and the outlet, the flow path passing serially through all of the functional spaces and the channel between the inlet and the outlet; and*
    *opposed first and second contact surfaces formed around opposite ends of the channel, the first and second contact surfaces facing towards the first and second mounting surfaces, respectively;*
    *wherein a first distance between the first contact surface and the first mounting surface is substantially less than a second distance between the second contact surface and the second mounting surface,* further comprising an extension arranged on the first mounting surface such that an extended distance between a distal end of the extension and the first contact surface is approximately equal to the second distance.

17. [The refrigerant valve manifold of claim 16.] *A refrigerant valve manifold comprising:*
    *a housing defining an interior volume, the housing having an inlet and outlet formed therein, the inlet and the outlet being in communication with the interior volume;*
    *a plurality of mounting surfaces arranged on the housing, the mounting surfaces adapted for mounting refrigerant system components, at least a first and a second of the plurality of mounting surfaces being substantially opposed;*
    *at least one boundary wall arranged in the housing interior such that the housing interior is divided into a plurality of spaces; a portion of the boundary wall being disposed between the first and second mounting surfaces, the portion of the boundary wall disposed between the first and second mounting surfaces having a channel extending therethrough; and*
    *opposed first and second contact surfaces formed around opposite ends of the channel, the first and second contact surfaces facing towards the first and second mounting surfaces, respectively;*
    *wherein a first distance between the first contact surface and the first mounting surface is substantially less than a second distance between the second contact surface and the second mounting surface;* wherein at least the first mounting surface and a third mounting surface are formed on a common external wall of the housing; and wherein at least two edges of the common external wall overhang adjacent external surfaces of the housing, and a plurality of projections extend from undersides of the two overhanging edges, the projections being located under bolt fixing positions of the first and third mounting surfaces.

19. A refrigerant valve arrangement comprising:

an integral housing having an inlet and an outlet connected by an interior volume, the interior volume divided into at least two pairs of functional spaces, each pair of functional spaces including a first functional space and a second functional space, the functional spaces adapted to accommodate functional elements;

an internal boundary wall separating the first and second functional spaces of a first pair of functional spaces, the internal boundary wall having a channel passing therethrough, the channel extending between the first and second functional spaces of the first pair of functional spaces;

first and second annular contact surfaces on the internal boundary wall, the first and second annular contact surfaces surrounding opposite ends of the channel;

at least the first functional space of the second pair of functional spaces disposed adjacent to at least the first functional space or the second functional space of the first pair of functional spaces; and a flow path extending within the integral housing between the inlet and the outlet, the flow path passing serially through all of the functional spaces and the channel between the inlet and the outlet;

wherein the housing has an external wall with at least one mounting surface formed thereon, the external wall having at least two edges that overhang adjacent external surfaces of the integral housing, and a plurality of projections extend from the two overhanging edges opposite the at least one mounting surface at bolt fixing positions.

20. A refrigerant valve arrangement comprising:

an integral housing having an inlet and an outlet connected by an interior volume, the interior volume divided into at least two pairs of functional spaces, each pair of functional spaces including a first functional space and a second functional space, the functional spaces adapted to accommodate functional elements;

an internal boundary wall separating the first and second functional spaces of a first pair of functional spaces, the internal boundary wall having a channel passing therethrough, the channel extending between the first and second functional spaces of the first pair of functional spaces;

first and second annular contact surfaces on the internal boundary wall, the first and second annular contact surfaces surrounding opposite ends of the channel;

at least the first functional space of the second pair of functional spaces disposed adjacent to at least the first functional space or the second functional space of the first pair of functional spaces; and a flow path extending within the integral housing between the inlet and the outlet, the flow path passing serially through all of the functional spaces and the channel between the inlet and the outlet;

wherein the housing has at least one mounting surface with an overhang on each end thereof, and wherein a plurality of projections extend from the overhanging ends at bolt fixing positions.

21. A refrigerant valve arrangement comprising:

an integral housing which has a first functional space, in which there is arranged at least one functional element, which co-operates with a first annular contact surface formed in an internal boundary wall, wherein arranged on that side of the boundary wall which is located opposite the first functional space is a second functional space, in which a second functional element can be positioned and which has a second annular contact surface, a channel which passes through the boundary wall opening out in both contact surfaces, wherein the housing has an external wall with at least one mounting surface formed thereon, the external wall having at least two edges that overhang adjacent external surfaces of the integral housing, and a plurality of projections extend from the two overhanging edges opposite the at least one mounting surface at bolt fixing positions.

22. A refrigerant valve arrangement comprising:

an integral housing having at least two pairs of functional spaces, each pair of functional spaces formed by a first functional space and a second functional space, the first pair of functional spaces having a first functional space, in which there is arranged at least one functional element, which co-operates with a first annular contact surface formed in an internal boundary wall, wherein arranged on that side of the boundary wall which is located opposite the first functional space is a second functional space, in which a second functional element can be positioned and which has a second annular contact surface on the internal boundary wall, a channel which passes through the boundary wall opening out in both contact surfaces;

wherein the at least two pairs of functional spaces are arranged within the integral housing, a first functional space of the second pair of functional spaces being in communication with the second functional space of the first pair of functional spaces;

wherein a flow path extends within the integral housing between a housing inlet and a housing outlet, the flow path passing serially through all of the functional spaces between the housing inlet and the housing outlet; and wherein the housing has a top external wall which, on its underside, has projections at bolt fixing positions.

23. The valve arrangement according to claim 22, wherein at outlets from the first functional spaces, the top external wall is provided with an annular bead in each case.

24. A refrigerant valve manifold comprising:

an integral housing defining an interior volume divided into at least two pairs of functional spaces, each pair of functional spaces including a first functional space and a second functional space, the integral housing having an inlet and outlet formed therein, the inlet and the outlet being in communication with the interior volume;

a plurality of mounting surfaces arranged on the integral housing, each mounting surface of the plurality of mounting surfaces being associated with a functional space of the at least two pairs of functional spaces, the mounting surfaces adapted for mounting refrigerant system components in the functional spaces, at least a first and a second of the plurality of mounting surfaces being substantially opposed, and at least a third of the plurality of mounting surfaces being substantially adjacent to one of the first or second mounting surfaces;

at least one boundary wall arranged in the housing interior, a portion of the boundary wall being disposed between the first and second mounting surfaces, the portion of the boundary wall disposed between the first and second mounting surfaces having a channel extending therethrough;

a flow path extending through the interior volume within the integral housing between the inlet and the outlet, the flow path passing serially through all of the functional spaces and the channel between the inlet and the outlet; and opposed first and second contact surfaces formed around opposite ends of the channel, the first and second contact surfaces facing towards the first and second mounting surfaces, respectively;

wherein a first distance between the first contact surface and the first mounting surface is substantially less than a second distance between the second contact surface and the second mounting surface;

wherein at least the first mounting surface and the third mounting surface are formed on a common external wall of the housing; and wherein at least two edges of the common external wall overhang adjacent external surfaces of the housing, and a plurality of projections extend from undersides of the two overhanging edges, the projections being located under bolt fixing positions of the first and third mounting surfaces.

* * * * *